United States Patent [19]
Gugel et al.

(10) Patent No.: US 11,263,648 B1
(45) Date of Patent: Mar. 1, 2022

(54) INFERRING LOCATION STRUCTURES BASED ON CONVERSION DATA

(71) Applicant: Meta Platforms, Inc., Menlo Park, CA (US)

(72) Inventors: Hans Alexander Gugel, London (GB); Konrad Komorowski, London (GB); Andrew Michael Pritchard, London (GB); Rituraj Kirti, Los Altos, CA (US); Stefano Romano, London (GB); David Tzoor, Givatayim, IL (US); Alesandra Agresti, London (GB); YuCheng Liou, Kirkland, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 208 days.

(21) Appl. No.: 16/056,345

(22) Filed: Aug. 6, 2018

(51) Int. Cl.
*G06Q 30/02* (2012.01)
*G06F 16/9535* (2019.01)
*G06F 16/9537* (2019.01)
*G06Q 50/00* (2012.01)
*H04L 29/08* (2006.01)
*H04L 67/50* (2022.01)

(52) U.S. Cl.
CPC ..... *G06Q 30/0201* (2013.01); *G06F 16/9535* (2019.01); *G06F 16/9537* (2019.01); *G06Q 30/0242* (2013.01); *G06Q 30/0251* (2013.01); *H04L 67/22* (2013.01); *G06Q 50/01* (2013.01)

(58) Field of Classification Search
CPC ........... G06Q 30/0201; G06Q 30/0242; G06Q 30/0251; G06Q 50/01; G06F 16/9535; G06F 16/9537; H04L 67/22
USPC ...................................................... 705/7.29
See application file for complete search history.

(56) References Cited

U.S. PATENT DOCUMENTS 8,996,417 B1 * 3/2015 Channakeshava ........................... G06Q 20/3224 705/30
10,540,681 B1 * 1/2020 McDonnell ........ G06Q 30/0633
10,929,459 B2 * 2/2021 Jones ...................... G06F 21/10
(Continued)

FOREIGN PATENT DOCUMENTS

WO WO-2011137123 * 4/2011 ............. G06Q 30/02
WO WO-2013173752 A1 * 11/2013 ......... G06F 16/2477

OTHER PUBLICATIONS

Kalpesh Popat, "Analysis, Design and Comparative study on Location Updating Strategies in Mobile Computing", Raksha Shakti University, Ahmedabad, India. Ph.D. Synopsis Submitted To Gujarat Technological University (2015). (Year: 2015).*

(Continued)

*Primary Examiner* — Rutao Wu
*Assistant Examiner* — Abdallah A El-Hage Hassan
(74) *Attorney, Agent, or Firm* — Baker Botts L.L.P.

(57) ABSTRACT

In one embodiment, a method includes receiving multiple data items respectively associated with multiple conversion events and identifying, from one or more data stores associated with a social-networking system, a content object corresponding to a business location, the content object including information describing the business location. The method also includes identifying one or more users, each being associated with at least one of the conversion events and updating the content object based at least in part on a determined location of each of one or more of the identified users at a time of the conversion event associated with the user.

19 Claims, 10 Drawing Sheets

(56) References Cited

U.S. PATENT DOCUMENTS

| | | | | |
|---|---|---|---|---|
| 2004/0010566 A1* | 1/2004 | Monteverde | .......... | H04L 69/329 |
| | | | | 709/217 |
| 2010/0280874 A1* | 11/2010 | Thorn | ................ | G06Q 30/0267 |
| | | | | 705/14.64 |
| 2011/0066614 A1* | 3/2011 | Chowdhury | ......... | G11B 27/036 |
| | | | | 707/736 |
| 2014/0279220 A1* | 9/2014 | Weiner | ............... | G06Q 30/0639 |
| | | | | 705/26.9 |
| 2016/0321679 A1* | 11/2016 | Dong | ................ | G06Q 30/0201 |
| 2017/0032707 A1* | 2/2017 | Bhatt | ................ | G06Q 30/0205 |
| 2017/0083985 A1* | 3/2017 | Lacoss-Arnold | ...... | G06Q 40/12 |
| 2017/0193491 A1* | 7/2017 | Phipps | ................ | G06Q 20/326 |
| 2018/0144377 A1* | 5/2018 | Patenaude | .............. | H04L 29/06 |
| 2019/0108563 A1* | 4/2019 | Hu | ...................... | G06F 16/9537 |

OTHER PUBLICATIONS

Scott Wallsten and Corwin Rhyan, "Social Media and Entrepreneurship: The Case of Food Trucks", Technology Policy Institute. 2014. (Year: 2014).*

Farag Sallabi, George Ditsa, "On-demand Dynamic Location-based Services Using Web Services" College of Information Technology United Arab Emirates University, 978-0-7695-4022-1/10 $26.00 © 2010 IEEE. 2010 (Year: 2014).*

\* cited by examiner

Map Data Types to Columns

Choose the data type and format that best matches each column of data. You may need to review columns that were automatically mapped. Map as many columns as possible to improve your ability to match your data to people on Notebook.

[Back] [Next: Review]

| Customer Details ⊙ | | | Event Time ⊙ | Event Details ⊙ | |
|---|---|---|---|---|---|
| Include data such as customer name, email address and phone number. This data will be hashed during upload. View Examples. | | | Include and accurate timestamp for each event. We recommend including timestamps accurate to the minute or second. View Examples. | Include the events that occurred, such as a purchase, lead or registration, as well as purchase value and currency (if applicable). View Examples. | |
| Email | Email | Phone Number | Email | Phone Number | Phone Number |
| email | email | phone | email | phone | phone |
| elizabetho@nb.com | olsene@nb.com | 1-(650) 561-5622 | eolson@nb.com | 1-(650) 782-5622 | 1-(650) 888-5622 |
| andrewj@nb.com | jamisona@nb.com | 1-(212) 736-3100 | ajamison@nb.com | 1-(212) 523-3100 | 1-(212) 123-3100 |
| margaretj@nb.com | johnsonm@nb.com | 1-(323) 857-6000 | mjohnson@nb.com | 1-(323) 617-6000 | 1-(323) 543-6000 |
| johnd@nb.com | doej@nb.com | 1-(312) 443-3600 | jdoe@nb.com | 1-(312) 555-3600 | 1-(312) 321-3600 |
| marks@nb.com | smithmark@nb.com | 1-44 303 123 7300 | msmith@nb.com | 1-44 871 663 1678 | 1-44 844 412 4653 |
| jamesm@nb.com | mclaughlinj@nb.com | 1-44 20 7219 4272 | jmclaughlin@nb.com | 1-44 844 482 5138 | 1-44 343 222 1234 |
| pauloa@nb.com | alessandrop@nb.com | 1-55 21 3938-6900 | palessandro@nb.com | 1-55 11 3091-3116 | 1-55 11 3113-3651 |

☑ First row is a header  Separator [Comma","▼]   Mapped: 21 columns  Not mapped: 0 columns  Ignored: 0 columns 500 — (container)
510 — (row indicator)

FIG. 5

△ City ✎

510 — email eolsen@nb.com ajamison@nb.com mjohnson@nb.com jdoe@nb.com msmith@nb.com jmclaughlin@nb.com palessandro@nb.com Customer Details ⌄
- Email
- Phone Number
- Mobile Advertiser ID
- First Name
- Last Name
- ZIP/Postal code
- ✓ City
- State/Province
- Country
- Date of Birth...
- Year of Birth
- Gender
- Age
- Extern ID...
- Lead ID Customer Details ›
Customer Details ›
Customer Details
Customer Details

Review Sample Upload Results

We've processed a sample of your file based on the mapping you provided. Please review the results and choose whether to continue with your upload, or go back to modify your file and mapping. By clicking Upload, you agree to Offline Conversions Terms.

[ Back ] [ Start Upload ]

We checked 1,000 rows in your file
Accepted: 888 events
Matched: 697 events

| 4 | 89% | 78% |
|---|---|---|
| WARNINGS | ACCEPTED ROWS | ESTIMATED MATCH RATE |

⚠ Warnings
We've detected the following issues with your file. Please review prior to uploading your data.

∨ 112 Sample Events Were Not Accepted   112 of 1,000 rows affected

ISSUE
112 events will not be uploaded due to invalid or missing data.

SOLUTION
Review your data mapping. You may need to update your data an upload a new file.
59 events have an invalid or missing Currency.
40 events have an invalid, missing, negative or zero event Value.
39 events don't have valid matching identifier

SAMPLE ERRORS

| Row | Email Column 1 | Phone Number Column 2 | Event Time Column 3 | Event Name Column 4 | Value Column 5 |
|---|---|---|---|---|---|
| ⚠ 5 | | 1-987-654-3210 | 2017-11-01T17:29:59.000Z | PURCHASE | 4.34 |
| ⚠ 15 | ucajwrgrhz_1472790647@t... | 15528196140 | 2017-11-01T17:31:11.000Z | PURCHASE | 392.50 |

∨ 10 Events Occurred Prior to an Ad Account Being Assigned   10 of 1000 rows affected ∨ Some of Your Timestamps are Inaccurate

*FIG. 7*

INFERRING LOCATION STRUCTURES BASED ON CONVERSION DATA

TECHNICAL FIELD

This disclosure generally relates to collecting and organizing information about entities associated with a social network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of pages connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a social-networking system may infer locations and other information about businesses and confirm, create or update records about the businesses accordingly. In particular embodiments, a business entity (e.g., a retailer, a restaurant chain) may operate at a plurality of locations. The different locations may be under direct management by the business entity or under separated management (e.g., a franchise structure). The social-networking system may store a plurality of content objects, each corresponding to a business location of a business entity. The business locations may be stored in location structures, which may comprise one or more parent pages each representing a brand and one or more location pages each representing a business location of the brand. On a social graph associated with the social-networking system, a node corresponding to a parent page may be connected to a node corresponding to a location page by an edge originating from the latter to the former and an edge originating from the former to the latter. Each such content object may comprise various information about the business location, such as its location, latitude-longitude coordinates, and business hours. The information may be displayed by the social-networking system in one or more user interfaces associated with the business location, such as a profile page. The information may also be used by one or more back-end processes associated with the social-networking system. For example, it can be used by a place visit detection system that detects use visits to locations. Application of this system may comprise determining how many visits were driven by a particular advertisement impression to a business location and improving the relevance of advertisements surfaced to users. The social-networking system may originally gather the information about a business location from an owner or manager of the business entity, a third-party business information provider, or one or more users through their check-in activities. However, the information provided about the business location may contain errors caused by, for example, mistakes in the input, untimeliness of updates, inconsistency among franchisees, or business locations being permanently closed. Particular embodiments disclosed herein provide a method for the social-networking system to analyze data items corresponding to a plurality of conversion events (e.g., credit card transactions) associated with a business location, intelligently derive knowledge about the business location, and update its records about the business location dynamically. Particular embodiments allow offline acquisition and processing of the data items, which allows preservation of the social-networking system's computing power and resources while achieving the goal of ensuring the accuracy of its records. Particular embodiments enhance the performance of tools provided by the social-networking system to business entities, such as marketing tools and advertisement services (e.g., increasing the relevance of advertisements pushed to users, improving direction service leading a user to a closest store), as well as the experience of end-users.

In particular embodiments, the social networking system may receive a plurality of data items respectively associated with a plurality of conversion events. Based on the data items, the social-networking system may identify, from one or more of its data stores, a content object corresponding to a business location, the content object comprising information describing the business location. The business location may be identified in one or more of the data items. In particular embodiments, a business location identified in one or more of the data items may not have a corresponding content object stored by the social-networking system. In this case, the social-networking system may create a content object corresponding to the business location. The social-networking system may also deduplicate or remove content objects when appropriate. The social-networking system may also identify one or more users, each being associated with at least one of the conversion events. It may access spatio-temporal information about the users to determine each user's location at the time of the corresponding conversion event. The social-networking system may then update the content object based at least in part on a determined location of each of one or more of the identified users at a time of the conversion event associated with the user. The updates to the content object may be used to revise the information displayed by the social-networking system and to enhance one or more services related to the business location. The use of user data contained in the data items may be subject to privacy settings associated with the relevant users.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 5 illustrates an example user interface displaying a list of data items.

FIG. 6 illustrates an example user interface displaying a menu for customizing data items.

FIG. 7 illustrates an example user interface displaying issues identified in uploaded data items.

DESCRIPTION OF EXAMPLE EMBODIMENTS

Figure 1:
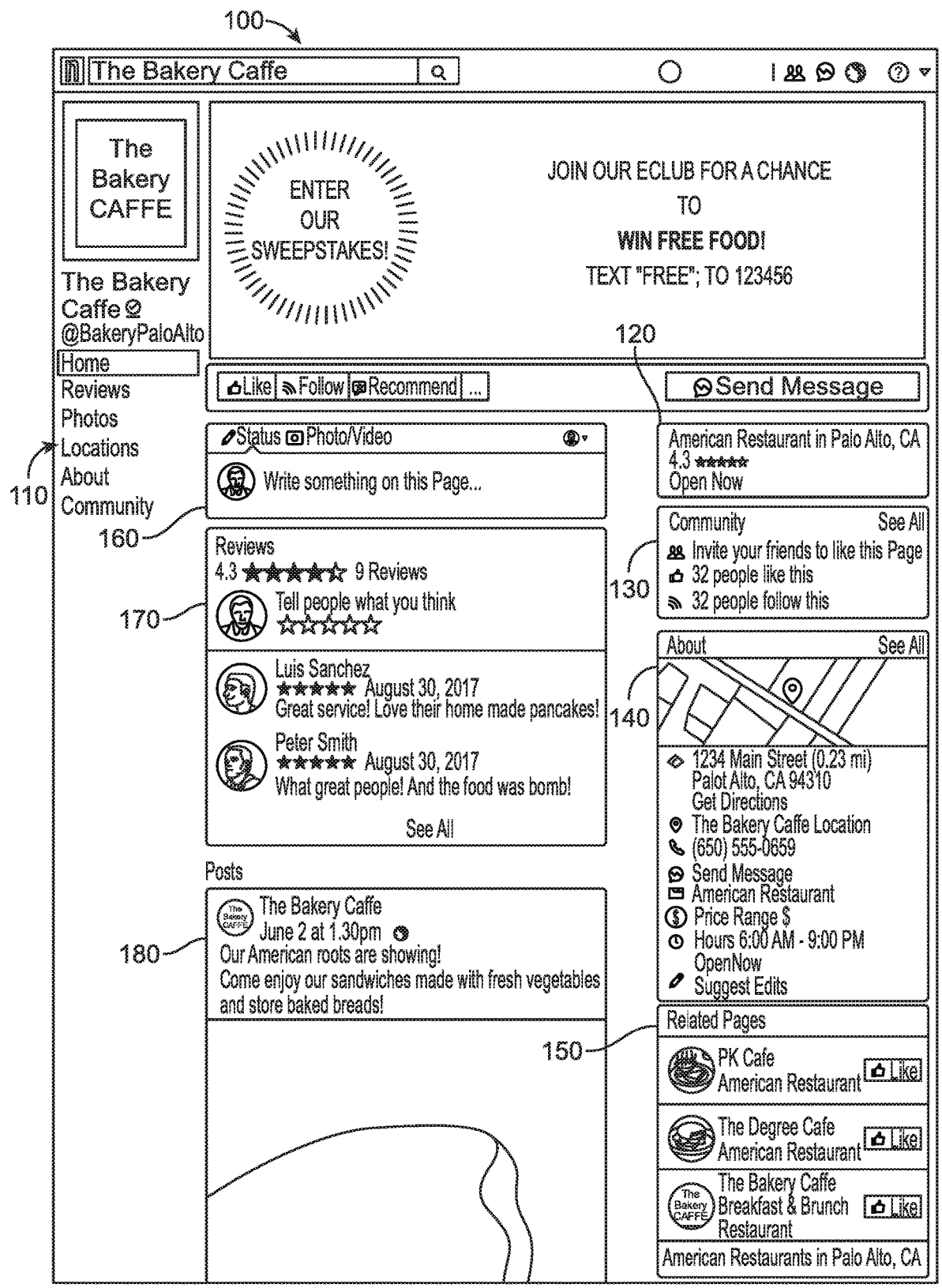
FIG. 1 illustrates an example user interface displaying a content object associated with a business location.

In particular embodiments, a social-networking system may infer locations and other information about businesses and confirm, create, or update records about the businesses accordingly. In particular embodiments, a business entity (e.g., a retailer, a restaurant chain) may operate at a plurality of locations. The different locations may be under direct management by the business entity or under separated management (e.g., a franchise structure). The social-networking system may store a plurality of content objects, each corresponding to a business location of a business entity. The business locations may be stored in location structures, which may comprise one or more parent pages each representing a brand and one or more location pages each representing a business location of the brand. On a social graph associated with the social-networking system, a node corresponding to a parent page may be connected to a node corresponding to a location page by an edge originating from the latter to the former and an edge originating from the former to the latter. Each such content object may comprise various information about the business location, such as its location, latitude-longitude coordinates, and business hours. The information may be displayed by the social-networking system in one or more user interfaces associated with the business location, such as a profile page. The information may also be used by one or more back-end processes associated with the social-networking system. For example, it can be used by a place visit detection system that detects use visits to locations. Application of this system may comprise determining how many visits were driven by a particular advertisement impression to a business location and improving the relevance of advertisements surfaced to users. The social-networking system may originally gather the information about a business location from an owner or manager of the business entity, a third-party business information provider, or one or more users through their check-in activities. However, the information provided about the business location may contain errors caused by, for example, mistakes in the input, untimeliness of updates, inconsistency among franchisees, or business locations being permanently closed. Particular embodiments disclosed herein provide a method for the social-networking system to analyze data items corresponding to a plurality of conversion events (e.g., credit card transactions) associated with a business location, intelligently derive knowledge about the business location, and update its records about the business location dynamically. Particular embodiments allow offline acquisition and processing of the data items, which allows preservation of the social-networking system's computing power and resources while achieving the goal of ensuring the accuracy of its records. Particular embodiments enhance the performance of tools provided by the social-networking system to business entities, such as marketing tools and advertisement services (e.g., increasing the relevance of advertisements pushed to users, improving direction service leading a user to a closest store), as well as the experience of end-users.

In particular embodiments, the social-networking system may receive a plurality of data items respectively associated with a plurality of conversion events. Based on the data items, the social-networking system may identify, from one or more of its data stores, a content object corresponding to a business location, the content object comprising information describing the business location. The business location may be identified in one or more of the data items. In particular embodiments, a business location identified in one or more of the data items may not have a corresponding content object stored by the social-networking system. In this case, the social-networking system may create a content object corresponding to the business location. The social-networking system may also deduplicate or remove content objects when appropriate. The social-networking system may also identify one or more users, each being associated with at least one of the conversion events. It may access spatio-temporal information about the users to determine each user's location at the time of the corresponding conversion event. The social-networking system may then update the content object based at least in part on a determined location of each of one or more of the identified users at a time of the conversion event associated with the user. The updates to the content object may be used to revise the information displayed by the social-networking system and to enhance one or more services related to the business location. The use of user data contained in the data items may be subject to privacy settings associated with the relevant users.

FIG. 1 illustrates an example user interface displaying a content object associated with a business location. In particular embodiments, the social-networking system may store a plurality of content objects, each corresponding to a business location of a business entity. Each content object may comprise various information about the business location such as, for example, an identifier of the store (e.g., a store code), a business name, an address, latitude-longitude coordinates, a polygonal shape of the business location, connection with another place (e.g., a storing being located in a mall), a phone number, business hours, products or services provided, one or more images, one or more videos, one or more reviews, other suitable information, or any combination thereof. In particular embodiments, the social-networking system may provide for display a profile page for each business location. The profile page may include one or more items of the aforementioned information about the business location. As an example and not by way of limitation, as illustrated by FIG. 1, the social-networking system may provide for display a profile page 100 about a business location of a business entity. The profile page 100 may comprise a sidenav section 110 linking to user interfaces displaying various information about the business location (e.g., reviews, photos, locations, about, community). The sidenav section 110 may comprise a "Locations" button linking to a page displaying a map of other locations that are part of a location structure associated with the business. The profile page 100 may comprise a section 120 showing a description of the business entity and a section 130 showing information about a community of users related to the business location. The profile page 100 may comprise a section 140 showing basic information about the business location, such as a location, a phone number, a price range, business hours, other suitable information, or any combination thereof. The profile page 100 may comprise a section 150 showing a list of other pages related to the business location. The profile page 100 may also comprise a section 160 allowing a user to post on the profile page 100, a section 170 showing a plurality of reviews about the business location and inviting a user to write a review, and a section 180 showing a plurality of posts by the business entity. Although FIG. 1 illustrates a particular profile page comprising particular information about a business location, this disclosure contemplates any suitable user interface comprising any suitable information about a business location.

Figure 2:
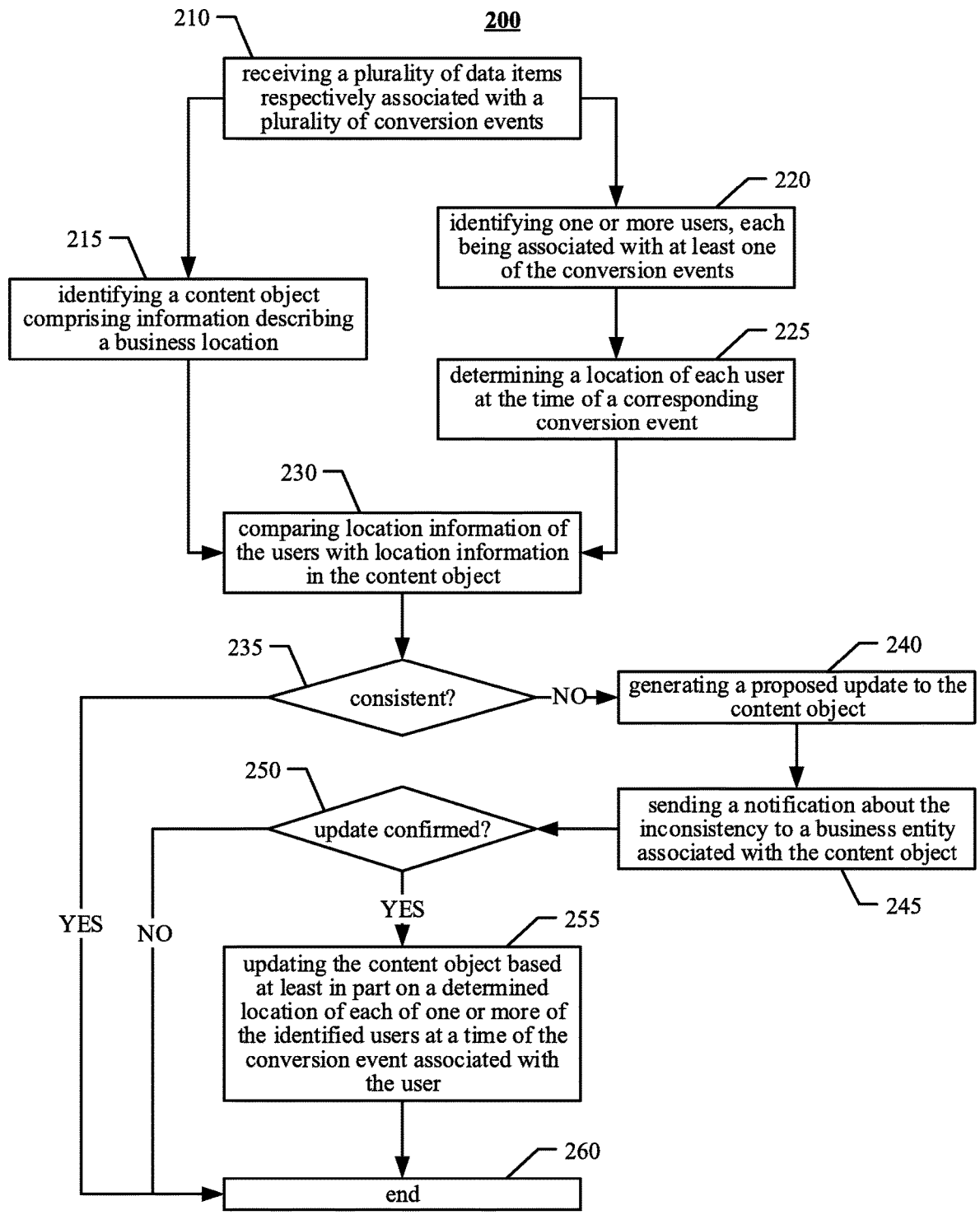
FIG. 2 illustrates an example method for updating information about a business location based on conversion data.

FIG. 2 illustrates an example method 200 for updating information about a business location based on conversion data. The method may begin at step 210, where the social-networking system may receive a plurality of data items respectively associated with a plurality of conversion events. The data items may be received from one or more of a plurality of sources. For example, the data items may be received from a computing device associated with a business entity associated with the business location, a computing device associated with a payment network (e.g., a point-of-sale device) associated with one or more of the conversion events, a client device associated with a user of the social-networking system, other suitable sources, or any combination thereof.

In particular embodiments, the data items may each correspond to a conversion event. A conversion event may correspond to a sale of goods, a provision of services, a membership enrollment, another suitable event, or any combination thereof. A plurality of data items may be collected offline by a computing system external to the social-networking system, aggregated, and then collectively provided to the social-networking system. The social networking system may specify a format of the data items. As an example and not by way of limitation, the data items may be submitted in a CSV file or any other spreadsheet file. In particular embodiments, the social-networking system may provide an application programming interface (API) to integrate with sales systems of businesses, so that the businesses may provide data items about conversion events as recorded by their sales systems.

In particular embodiments, a data item associated with a conversion event may comprise information such as, for example, an identifier of a business entity, an identifier of a business location, an identifier of a customer, a description of a customer (e.g., demographic features of the customer including age, gender, race, etc.), a timestamp, information about an amount of payment, information about a product or service, other suitable information, or any combination thereof. The entry categories for each data item may be specified by the social-networking system. Such entries may comprise, for example, a customer identifier, a store code, purchase data, an amount of payment, other suitable information, or any combination thereof.

Figure 3:
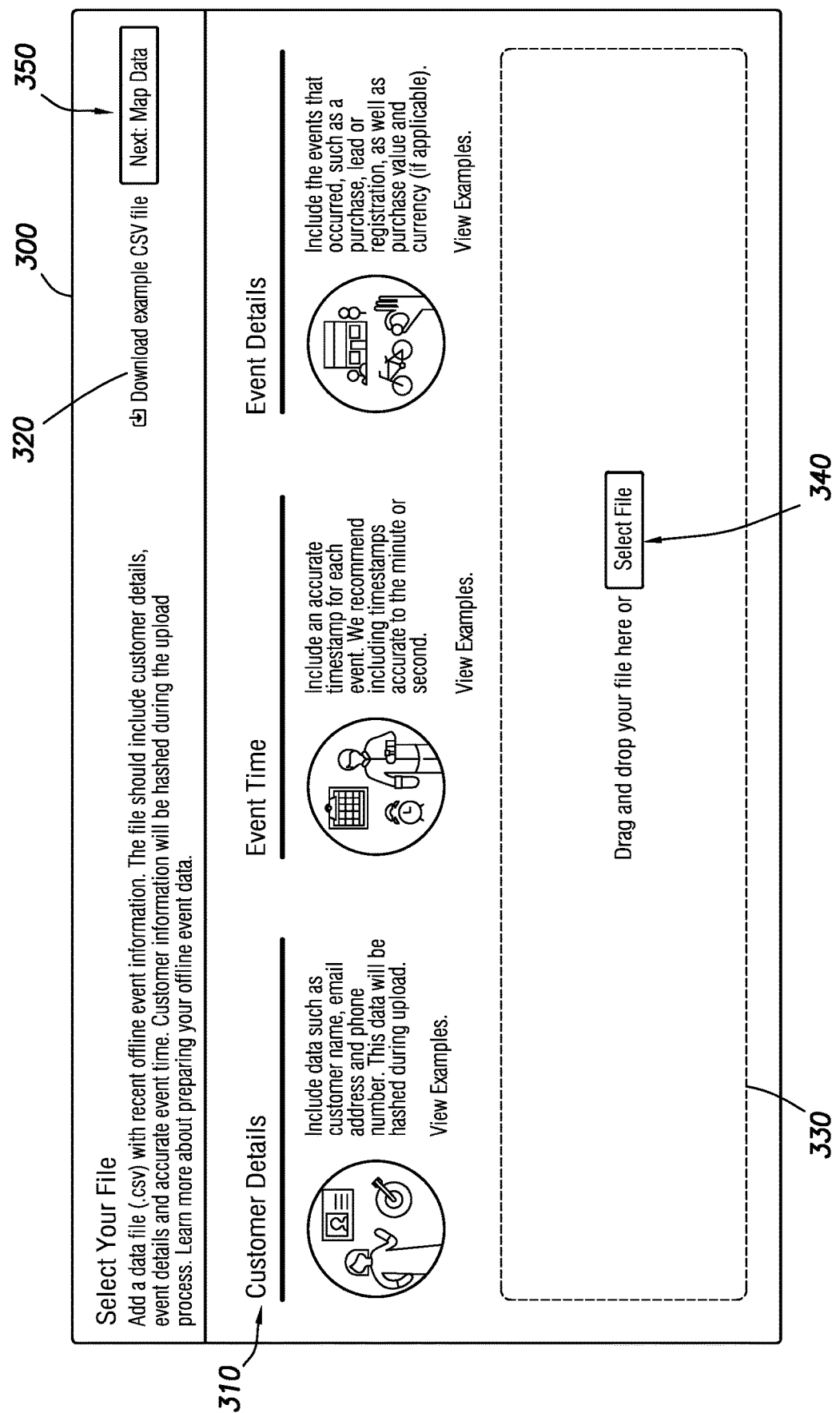
FIG. 3 illustrates an example user interface for uploading data items about one or more conversion events.

FIG. 3 illustrates an example user interface 300 for uploading data items about one or more conversion events. The user interface 300 may comprise a field 310 showing explanations, requirements, and suggestions regarding the data items to be provided by, for example, a business entity, and an element 320 providing an example file containing data items for download. The user interface 300 may also comprise a field 330 allowing a user to upload a data file by dragging and dropping the file and a button 340 allowing a user to select a file for upload. When a user has completed uploading a document containing data items associated with conversion events, the user may click on the button 350 to proceed to the next step.

Figure 4:
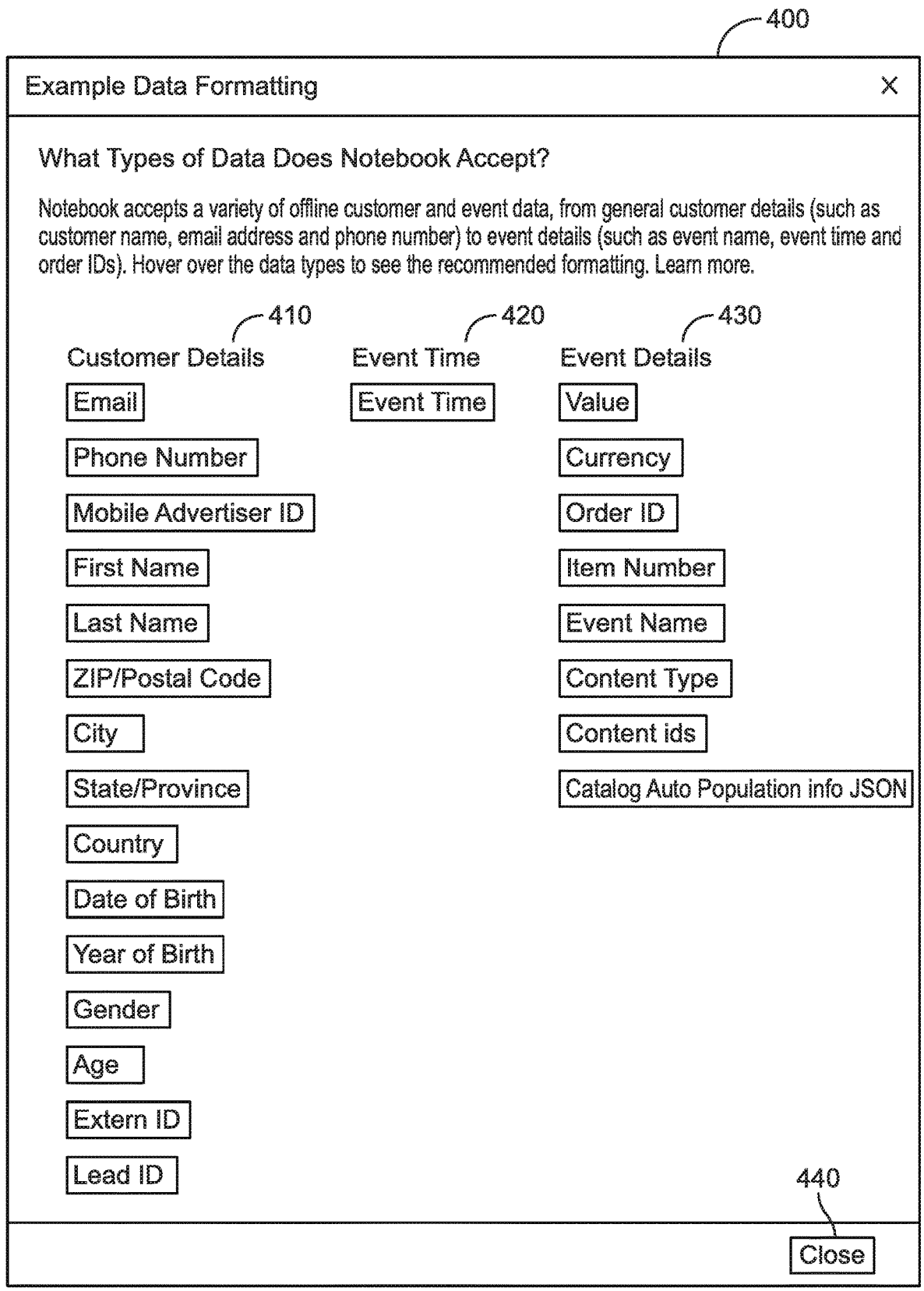
FIG. 4 illustrates an example user interface displaying one or more categories of acceptable data.

FIG. 4 illustrates an example user interface 400 displaying one or more categories of acceptable data. The user interface 400 may comprises one or more lists of data categories that describe conversion events and are accepted by the social-networking system. The user interface 400 may comprise a list 410 of data categories for customer details, a list 420 of data categories for event time, and a list 430 of data categories for event details. This user interface can be closed by interacting with the button 440.

FIG. 5 illustrates an example user interface 500 displaying a list of data items. In particular embodiments, the social-networking system may extract a plurality of data items from a data file it receives and map out the data into a table format. An example of such a table 510 may comprise a plurality of columns each corresponding to a data category for the data items. The table 510 may comprise a plurality of rows each corresponding to a particular data item for a particular conversion event.

FIG. 6 illustrates an example user interface 600 displaying a menu for customizing data items. In particular embodiments, the social-networking system may allow a user providing data to customize and specify the various entries for each data item. The user may, for example, click on a column of the table 510. A menu 610 may pop out allowing the user to select a category corresponding to the column.

FIG. 7 illustrates an example user interface 700 displaying issues identified in uploaded data items. In particular embodiments, the social-networking system may provide a user interface 700 summarizing the data items received as part of a particular data file uploaded by a user. The user interface 700 may comprise a field 710 summarizing a number of data items/events received and successfully mapped to the format required by the social-networking system. The user interface may also comprise a field 720 summarizing issues, warning, and potential solutions related to the received data items. The user interface 700 may comprise a button 730 allowing the user to (re)upload a data file and a button 740 to go to the previous step. Although FIGS. 3-7 display particular user interfaces associated with uploading data files comprising data items about conversion events, this disclosure contemplates any suitable user interfaces associated with any suitable method of providing data items about conversion events.

At step 215 of FIG. 2, the social-networking system may identify, from one or more data stores associated with the social-networking system, a content object corresponding to a business location based on the data items received at step 210. The content object may comprise information describing the business location. The information describing the business location may comprise an identifier of the store (e.g., a store code), a business name, an address, a phone number, business hours, products or services provided, one or more images, one or more videos, one or more reviews, other suitable information, or any combination thereof. Information associated with the content object may be displayed as a profile page by the social-networking system. The content object may be identified based on an identifier of a business entity or an identifier of a business location for each of one or more of the conversion events associated with the data items.

At step 220, the social-networking system may identify, based on the data items received at step 210, one or more users, each being associated with at least one of the conversion events. The users may each have an account with the social-networking system. They may be identified based on person identifiers contained by the data items associated with the conversion events.

At step 225, the social-networking system may determine a location of each of one or more of the identified users at the time of a corresponding conversion event. The social-networking system may access and store location data about its users. In particular embodiments, a location associated with a user may be determined based on data received from a client device associated with the user. The location data may be in the form of a pair of latitude and longitude, a street address, an area in city, another suitable form, or any combination thereof. As an example and not by way of limitation, the social-networking system may receive GPS signals from a mobile device associated with a user. The GPS signals may be collected by an application associated with the social-networking system and periodically reported to the social-networking system. As another example and not by way of limitation, the social-networking system may also collect Wi-Fi signatures from a mobile device associated with a user and determine the location of the mobile device based on the Wi-Fi signatures. The location data may be stored as a time series that links locations data points to time data points. The social-networking system may access the data item associated with a conversion event to determine the time of the conversion event. It may retrieve location data associated with the user identified in the data item and cross-reference the location data with the determined time to identify the location of the user at the time of the conversion event.

In particular embodiments, the social-networking system may provide functionalities for a user to make payments. The user may link one or more payment accounts with an account associated with the social-networking system. A payment can be made via, for example, a messaging service provided by the social-networking system, a third-party payment service, a near-field-communication payment service available on the user's mobile device, another method, or any combination thereof. The social-networking system may identify a user associated with a conversion event based on a payment processed by the social-networking system. As an example and not by way of limitation, a user may make a payment to a business via a link on a profile page of the business on the social-networking system. The social-networking system may use one or more filters to select data about only those payments made in store, where the user's location information is relevant. The social-networking system may generate one or more data items associated with conversion events based on payment transaction information directly collected by the social-networking system or obtained from a third-party payment application.

In particular situations, the conversion data may comprise one or more erred data items. The errors may be caused by behavior of users. As an example and not by way of limitation, a first person may borrow and use a membership card of a second person to make a purchase from a merchant. The merchant may generate conversion data based on information associated with the membership card and record the second person as the purchaser of a product, while the first person was the actual purchaser. Such an error may also occur when a payment instrument (e.g., credit card, debit card, mobile device) used for a transaction does not belong to the user who actually performed the transaction. Computing devices associated with business locations may also provide erred data (e.g., data with erred timestamps) to the social-networking system. The social-networking system may intelligently identify and remove such erred data using one or more machine-learning or artificial-intelligence techniques. Alternatively, the social-networking system may correct such erred data for use.

In particular embodiments, the social-networking system may identify incorrect or missing data items by detecting data items that are outliers. The social-networking system may identify one or more users based on the data items associated with one or more conversion events, access spatio-temporal information associated with the users, and filter out one or more of the users by comparing the spatio-temporal information associated with the users with information associated with the conversion events. As an example and not by way of limitation, the social-networking system may identify a user Jane and a store location for a chain coffee shop based on a data item associated with a conversion event. The social-networking system may access spatio-temporal information about Jane to determine that Jane was in New York at the time of the conversion event. It may also check data objects associated with the store location to determine that the store is located in San Francisco. The social-networking system may determine that even if the store location on record was incorrect, it is unlikely to be erred so much to be in an entirely different region and that it is more likely that Jane was misidentified. The social-networking system may accordingly remove this data item. As another example and not by way of limitation, the social-networking system may identify a user John based on a data item associated with a conversion event and determine a location of John at the time of the conversion event. At the same time, the social-networking system may access data items associated with a plurality of other conversion events associated with the same business location and determine the locations of the users identified in these data items. The social-networking system may compare the location of John with those of the other users and determine that John's location is substantially different from the other locations. It may accordingly determine John to be an outlier and remove his corresponding data item.

In particular embodiments, the social-networking system may match a data item to a correct user based on relationships among users stored in a social graph. The social-networking system may identify a first user based on the data item associated with a conversion event, identify one or more second users each being connected to the first user on a social graph associated with the social-networking system, and select one of the second users as being associated with the conversion event. The second user is selected based on information about a relationship between the second user and the first user on the social-networking system or spatio-temporal information associated with the second user. As an example and not by way of limitation, the social-networking system may identify a user Mary based on a user identifier included in a data item associated with a conversion event. However, based on data associated with Mary that are received and stored by the social-networking system (e.g., a check-in at a location far from a business location associated with the conversion event, registration to an event that keeps Mary busy at the time of the conversion event, etc.), the social-networking system may determine that Mary is unlikely to have been involved in the conversion event. The social-networking system may then search the social graph for one or more users with a relationship to Mary (e.g., a node representing each user being connected by one or more edges to a node representing Mary). The social-networking system may limit its search to users within a certain degree of separation from Mary. The social-networking system may identify a user Harry and determine that Harry is Mary's husband. It may determine a location of Harry at the time of the conversion event is consistent with one or more other users associated with one or more other conversion event involving the same business location. In this case, the social-networking system may correct the identified user to be Harry. This process may be subject to privacy settings associated with Mary, Harry, and one or more other users.

At step 230, the social-networking system may compare location information of the users associated with conversion events for a particular business location and location information stored in the content object for the business location. In particular embodiments, the social-networking system may aggregate the locations of the identified users by, for example, aggregating a cluster of coordinates, finding a weighted average of the locations, selecting a location for a majority of the users, another suitable method, or any combination thereof. At step 235, the social networking system may determine whether the location information as stored in the content object corresponding to the business location is consistent with the location information of the users. If so, the social-networking system may proceed to step 260 to end the process as no correction is needed for the location information. Otherwise, the social-networking system may proceed to step 240.

In particular embodiments, the social-networking system may update the content object based at least in part on a determined location of each of one or more of the identified users at a time of the conversion event associated with the user. As an example and not by way of limitation, if users purchasing from a merchant all appear to be at a particular location at the time of purchase and the location is not stored by the social-networking system, the social-networking system may add the detected location as a new business location associated with the merchant. In this case, the social-networking system may generate a new content object corresponding to the new business location and may provide for display information associated with the new content object. As another example and not by way of limitation, if the conversion events for a store converge to a location different from what was provided to the social-networking system, the social-networking system may update the location that was stored. In particular, the social-networking system may modify information stored in the content object corresponding to the store. As yet another example and not by way of limitation, if the social-networking system does not receive information about any conversion events at a particular business location, the social-networking system may remove the business location. In particular, the social-networking system may unpublish a page associated with the business location or mark it as "permanently closed." The social-networking system may remove a content object corresponding to the business location or change the information of the content object to reflect that the business location is inactive or closed.

In particular embodiments, the social-networking system may also update other information about a particular business location, such as its business hours, based on offline conversion data. As an example and not by way of limitation, if some conversion events associated with a business location occur at a time period outside business hours of the business location provided to and stored by the social-networking system, the social-networking system may update the business hours to include the time period. As another example and not by way of limitation, if the social-networking system does not receive any data items associated with conversion events at a business location for a time period within business hours of the business location provided to the stored by the social-networking system, the social-networking system may update the business hours to exclude the time period.

In particular embodiments, the social-networking system may verify a potential change to a content object before making the change. At step 240, the social-networking system may generate a proposed update to a content object corresponding to a business location, where the proposed update is directed to inconsistency between the data items and stored information about the business location. Then, at step 245, the social-networking system may send a notification about the inconsistency and the proposed update to a business entity associated with the content object or an administrator of a corresponding page. The social-networking system may also set a flag indicating a pending update. The recipient of the notification may be a representative of the business entity, a local manager of the business entity, a franchisee of the business entity, a third-party agent providing publicity management services, another suitable person or entity, or any combination thereof. The notification may be sent as, for example, an email, a message associated with the social-networking system, a push notification from an application associated with the social-networking system, another suitable method, or any combination thereof. The notification may comprise one or more interactive elements allowing the recipient to indicate whether the change is accepted or denied. The notification may also prompt the recipient to reply with a confirmation.

At step 250, the social-networking system may determine whether it has received a confirmation of a proposed update. If so, it may proceed to step 255, where the social-networking system may update the content object associated with the business location based at least in part on a determined location of each of a plurality of the identified users at a time of the conversion event associated with the user. If the social-networking system receives a message affirmatively dismissing or rejecting the proposed update, the social-networking system may proceed to step 260, where it may end the process of updating the content object. If the social-networking system does not receive any response to a proposed update for a pre-determined period of time, it may be configured to proceed either to step 255 or to step 260.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for updating information about a business location based on conversion data including the particular steps of the method of FIG. 1, this disclosure contemplates any suitable method for updating information about a business location based on conversion data including any suitable steps, which may include all, some, or none of the steps of the method of FIG. 1, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

In particular embodiments, the social-networking system may provide services for businesses to market their products or services. As an example and not by way of limitation, the social-networking system may allow publish commercial information on their profile pages or post advertisements. The social-networking system may use location information about the businesses in combination with these services. As an example and not by way of limitation, the social-networking system may target advertisements or promotional materials for a particular business location to a user when the user is determined to be in proximity to the business location. More accurate records of locations of business locations may improve the effectiveness of advertisement efforts and increase a number of visits to particular business locations.

Figure 8:
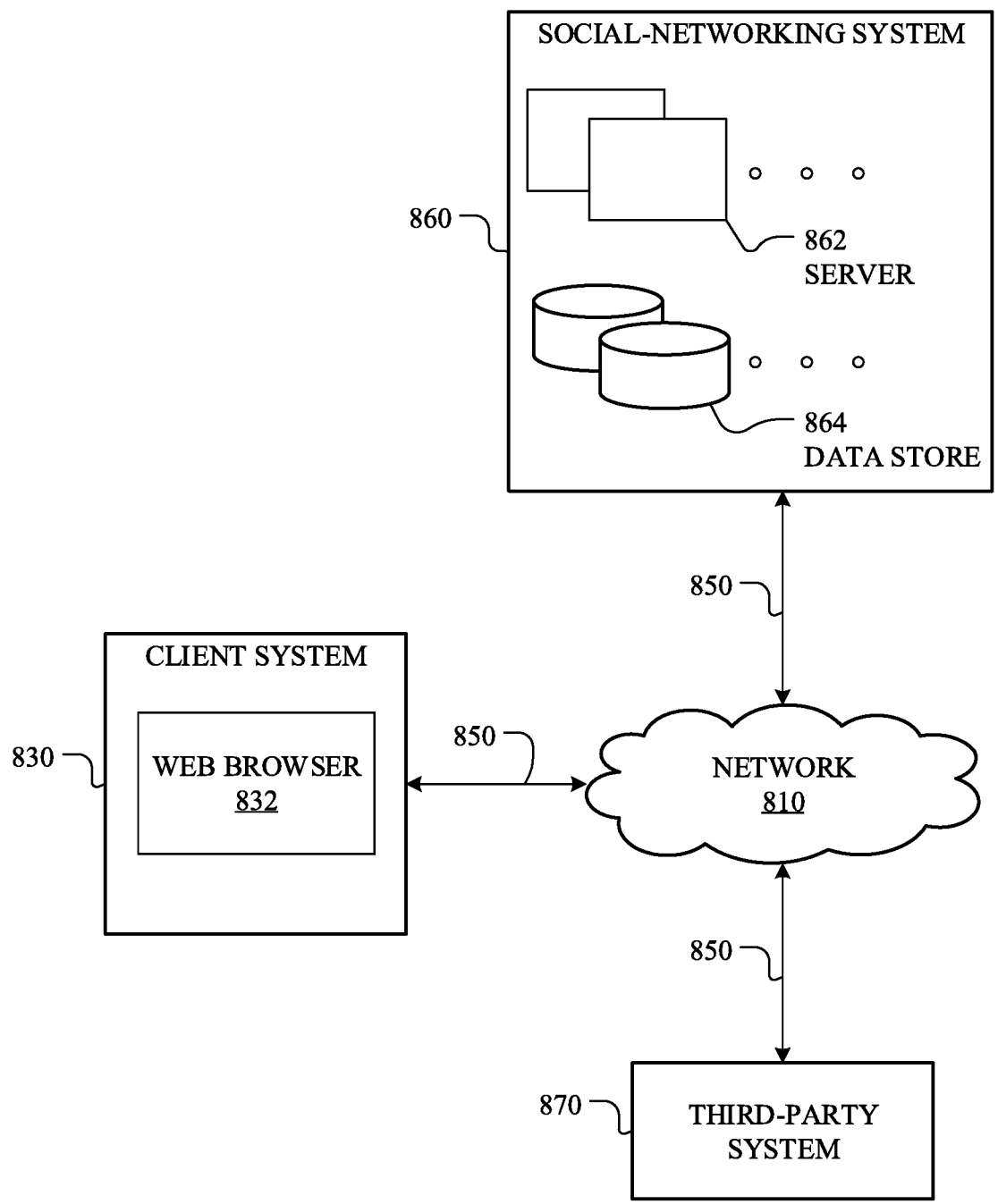
FIG. 8 illustrates an example network environment associated with a social-networking system.

FIG. 8 illustrates an example network environment 800 associated with a social-networking system. Network environment 800 includes a client system 830, a social-networking system 860, and a third-party system 870 connected to each other by a network 810. Although FIG. 8 illustrates a particular arrangement of client system 830, social-networking system 860, third-party system 870, and network 810, this disclosure contemplates any suitable arrangement of client system 830, social-networking system 860, third-party system 870, and network 810. As an example and not by way of limitation, two or more of client system 830, social-networking system 860, and third-party system 870 may be connected to each other directly, bypassing network 810. As another example, two or more of client system 830, social-networking system 860, and third-party system 870 may be physically or logically co-located with each other in whole or in part. Moreover, although FIG. 8 illustrates a particular number of client systems 830, social-networking systems 860, third-party systems 870, and networks 810, this disclosure contemplates any suitable number of client systems 830, social-networking systems 860, third-party systems 870, and networks 810. As an example and not by way of limitation, network environment 800 may include multiple client system 830, social-networking systems 860, third-party systems 870, and networks 810.

This disclosure contemplates any suitable network 810. As an example and not by way of limitation, one or more portions of network 810 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 810 may include one or more networks 810.

Links 850 may connect client system 830, social-networking system 860, and third-party system 870 to communication network 810 or to each other. This disclosure contemplates any suitable links 850. In particular embodiments, one or more links 850 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 850 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 850, or a combination of two or more such links 850. Links 850 need not necessarily be the same throughout network environment 800. One or more first links 850 may differ in one or more respects from one or more second links 850.

In particular embodiments, client system 830 may be an electronic device including hardware, software, or embedded logic components or a combination of two or more such components and capable of carrying out the appropriate functionalities implemented or supported by client system 830. As an example and not by way of limitation, a client system 830 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 830. A client system 830 may enable a network user at client system 830 to access network 810. A client system 830 may enable its user to communicate with other users at other client systems 830.

In particular embodiments, client system 830 may include a web browser 832, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 830 may enter a Uniform Resource Locator (URL) or other address directing the web browser 832 to a particular server (such as server 862, or a server associated with a third-party system 870), and the web browser 832 may generate a Hyper Text Transfer Protocol (HTTP) request and communicate the HTTP request to server. The server may accept the HTTP request and communicate to client system 830 one or more Hyper Text Markup Language (HTML) files responsive to the HTTP request. Client system 830 may render a webpage based on the HTML files from the server for presentation to the user.

This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 860 may be a network-addressable computing system that can host an online social network. Social-networking system 860 may generate, store, receive, and send social-networking data, such as, for example, user-profile data, concept-profile data, social-graph information, or other suitable data related to the online social network. Social-networking system 860 may be accessed by the other components of network environment 800 either directly or via network 810. As an example and not by way of limitation, client system 830 may access social-networking system 860 using a web browser 832, or a native application associated with social-networking system 860 (e.g., a mobile social-networking application, a messaging application, another suitable application, or any combination thereof) either directly or via network 810. In particular embodiments, social-networking system 860 may include one or more servers 862. Each server 862 may be a unitary server or a distributed server spanning multiple computers or multiple datacenters. Servers 862 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 862 may include hardware, software, or embedded logic components or a combination of two or more such components for carrying out the appropriate functionalities implemented or supported by server 862. In particular embodiments, social-networking system 860 may include one or more data stores 864. Data stores 864 may be used to store various types of information. In particular embodiments, the information stored in data stores 864 may be organized according to specific data structures. In particular embodiments, each data store 864 may be a relational, columnar, correlation, or other suitable database. Although this disclosure describes or illustrates particular types of databases, this disclosure contemplates any suitable types of databases. Particular embodiments may provide interfaces that enable a client system 830, a social-networking system 860, or a third-party system 870 to manage, retrieve, modify, add, or delete, the information stored in data store 864.

In particular embodiments, social-networking system 860 may store one or more social graphs in one or more data stores 864. In particular embodiments, a social graph may include multiple nodes—which may include multiple user nodes (each corresponding to a particular user) or multiple concept nodes (each corresponding to a particular concept)—and multiple edges connecting the nodes. Social-networking system 860 may provide users of the online social network the ability to communicate and interact with other users. In particular embodiments, users may join the online social network via social-networking system 860 and then add connections (e.g., relationships) to a number of other users of social-networking system 860 to whom they want to be connected. Herein, the term "friend" may refer to any other user of social-networking system 860 with whom a user has formed a connection, association, or relationship via social-networking system 860.

In particular embodiments, social-networking system 860 may provide users with the ability to take actions on various types of items or objects, supported by social-networking system 860. As an example and not by way of limitation, the items and objects may include groups or social networks to which users of social-networking system 860 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 860 or by an external system of third-party system 870, which is separate from social-networking system 860 and coupled to social-networking system 860 via a network 810.

In particular embodiments, social-networking system 860 may be capable of linking a variety of entities. As an example and not by way of limitation, social-networking system 860 may enable users to interact with each other as well as receive content from third-party systems 870 or other entities, or to allow users to interact with these entities through an application programming interfaces (API) or other communication channels.

In particular embodiments, a third-party system 870 may include one or more types of servers, one or more data stores, one or more interfaces, including but not limited to APIs, one or more web services, one or more content sources, one or more networks, or any other suitable components, e.g., that servers may communicate with. A third-party system 870 may be operated by a different entity from an entity operating social-networking system 860. In particular embodiments, however, social-networking system 860 and third-party systems 870 may operate in conjunction with each other to provide social-networking services to users of social-networking system 860 or third-party systems 870. In this sense, social-networking system 860 may provide a platform, or backbone, which other systems, such as third-party systems 870, may use to provide social-networking services and functionality to users across the Internet.

In particular embodiments, a third-party system 870 may include a third-party content object provider. A third-party content object provider may include one or more sources of content objects, which may be communicated to a client system 830. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 860 also includes user-generated content objects, which may enhance a user's interactions with social-networking system 860. User-generated content may include anything a user can add, upload, send, or "post" to social-networking system 860. As an example and not by way of limitation, a user communicates posts to social-networking system 860 from a client system 830. Posts may include data such as status updates or other textual data, location information, photos, videos, links, music or other similar data or media. Content may also be added to social-networking system 860 by a third-party through a "communication channel," such as a newsfeed or stream.

In particular embodiments, social-networking system 860 may include a variety of servers, sub-systems, programs, modules, logs, and data stores. In particular embodiments, social-networking system 860 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 860 may also include suitable components such as network interfaces, security mechanisms, load balancers, failover servers, management-and-network-operations consoles, other suitable components, or any suitable combination thereof. In particular embodiments, social-networking system 860 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 860 to one or more client systems 830 or one or more third-party system 870 via network 810. The web server may include a mail server or other messaging functionality for receiving and routing messages between social-networking system 860 and one or more client systems 830. An API-request server may allow a third-party system 870 to access information from social-networking system 860 by calling one or more APIs. An action logger may be used to receive communications from a web server about a user's actions on or off social-networking system 860. In conjunction with the action log, a third-party-content-object log may be maintained of user exposures to third-party-content objects. A notification controller may provide information regarding content objects to a client system 830. Information may be pushed to a client system 830 as notifications, or information may be pulled from client system 830 responsive to a request received from client system 830. Authorization servers may be used to enforce one or more privacy settings of the users of social-networking system 860. A privacy setting of a user determines how particular information associated with a user can be shared. The authorization server may allow users to opt in to or opt out of having their actions logged by social-networking system 860 or shared with other systems (e.g., third-party system 870), such as, for example, by setting appropriate privacy settings. Third-party-content-object stores may be used to store content objects received from third parties, such as a third-party system 870. Location stores may be used for storing location information received from client systems 830 associated with users. Advertisement-pricing modules may combine social information, the current time, location information, or other suitable information to provide relevant advertisements, in the form of notifications, to a user.

Figure 9:
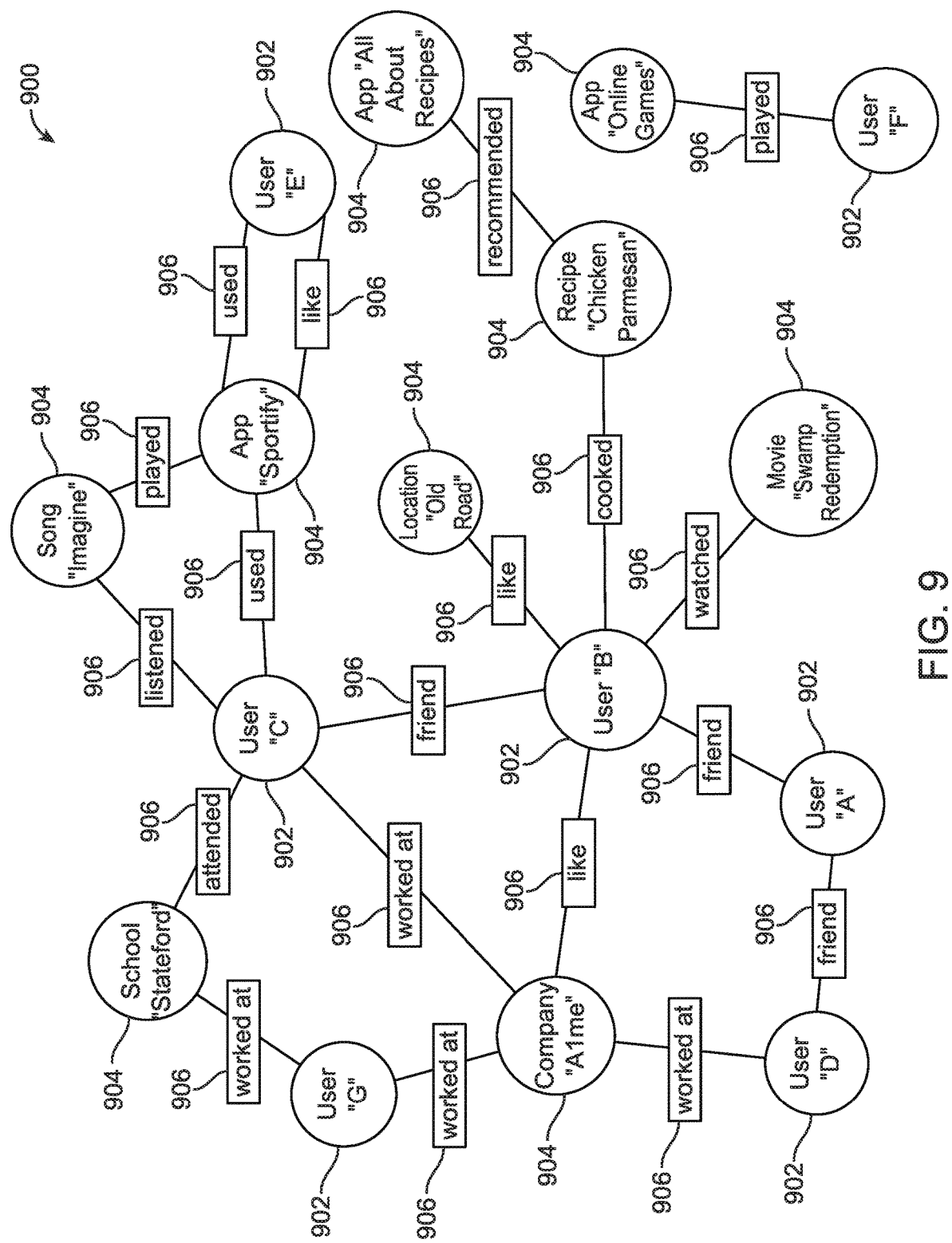
FIG. 9 illustrates an example social graph.

FIG. 9 illustrates example social graph 900. In particular embodiments, social-networking system 860 may store one or more social graphs 900 in one or more data stores. In particular embodiments, social graph 900 may include multiple nodes—which may include multiple user nodes 902 or multiple concept nodes 904—and multiple edges 906 connecting the nodes. Each node may be associated with a unique entity (i.e., user or concept), each of which may have a unique identifier (ID), such as a unique number or username. Example social graph 900 illustrated in FIG. 9 is shown, for didactic purposes, in a two-dimensional visual map representation. In particular embodiments, a social-networking system 860, client system 830, or third-party system 870 may access social graph 900 and related social-graph information for suitable applications. The nodes and edges of social graph 900 may be stored as data objects, for example, in a data store (such as a social-graph database). Such a data store may include one or more searchable or queryable indexes of nodes or edges of social graph 900.

In particular embodiments, a user node 902 may correspond to a user of social-networking system 860. As an example and not by way of limitation, a user may be an individual (human user), an entity (e.g., an enterprise, business, or third-party application), or a group (e.g., of individuals or entities) that interacts or communicates with or over social-networking system 860. In particular embodiments, when a user registers for an account with social-networking system 860, social-networking system 860 may create a user node 902 corresponding to the user, and store the user node 902 in one or more data stores. Users and user nodes 902 described herein may, where appropriate, refer to registered users and user nodes 902 associated with registered users. In addition or as an alternative, users and user nodes 902 described herein may, where appropriate, refer to users that have not registered with social-networking system 860. In particular embodiments, a user node 902 may be associated with information provided by a user or information gathered by various systems, including social-networking system 860. As an example and not by way of limitation, a user may provide his or her name, profile picture, contact information, birth date, sex, marital status, family status, employment, education background, preferences, interests, or other demographic information. In particular embodiments, a user node 902 may be associated with one or more data objects corresponding to information associated with a user. In particular embodiments, a user node 902 may correspond to one or more webpages.

In particular embodiments, a concept node 904 may correspond to a concept. As an example and not by way of limitation, a concept may correspond to a place (such as, for example, a movie theater, restaurant, landmark, or city); a website (such as, for example, a website associated with social-network system 860 or a third-party website associated with a web-application server); an entity (such as, for example, a person, business, group, sports team, or celebrity); a resource (such as, for example, an audio file, video file, digital photo, text file, structured document, or application) which may be located within social-networking system 860 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 904 may be associated with information of a concept provided by a user or information gathered by various systems, including social-networking system 860. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 904 may be associated with one or more data objects corresponding to information associated with concept node 904. In particular embodiments, a concept node 904 may correspond to one or more webpages.

In particular embodiments, a node in social graph 900 may represent or be represented by a webpage (which may be referred to as a "profile page"). Profile pages may be hosted by or accessible to social-networking system 860. Profile pages may also be hosted on third-party websites associated with a third-party system 870. As an example and not by way of limitation, a profile page corresponding to a particular external webpage may be the particular external webpage and the profile page may correspond to a particular concept node 904. Profile pages may be viewable by all or a selected subset of other users. As an example and not by way of limitation, a user node 902 may have a corresponding user-profile page in which the corresponding user may add content, make declarations, or otherwise express himself or herself. As another example and not by way of limitation, a concept node 904 may have a corresponding concept-profile page in which one or more users may add content, make declarations, or express themselves, particularly in relation to the concept corresponding to concept node 904.

In particular embodiments, a concept node 904 may represent a third-party webpage or resource hosted by a third-party system 870. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 830 to send to social-networking system 860 a message indicating the user's action. In response to the message, social-networking system 860 may create an edge (e.g., a check-in-type edge) between a user node 902 corresponding to the user and a concept node 904 corresponding to the third-party webpage or resource and store edge 906 in one or more data stores.

In particular embodiments, a pair of nodes in social graph 900 may be connected to each other by one or more edges 906. An edge 906 connecting a pair of nodes may represent a relationship between the pair of nodes. In particular embodiments, an edge 906 may include or represent one or more data objects or attributes corresponding to the relationship between a pair of nodes. As an example and not by way of limitation, a first user may indicate that a second user is a "friend" of the first user. In response to this indication, social-networking system 860 may send a "friend request" to the second user. If the second user confirms the "friend request," social-networking system 860 may create an edge 906 connecting the first user's user node 902 to the second user's user node 902 in social graph 900 and store edge 906 as social-graph information in one or more of data stores 864. In the example of FIG. 9, social graph 900 includes an edge 906 indicating a friend relation between user nodes 902 of user "A" and user "B" and an edge indicating a friend relation between user nodes 902 of user "C" and user "B." Although this disclosure describes or illustrates particular edges 906 with particular attributes connecting particular user nodes 902, this disclosure contemplates any suitable edges 906 with any suitable attributes connecting user nodes 902. As an example and not by way of limitation, an edge 906 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 900 by one or more edges 906. The degree of separation between two objects represented by two nodes, respectively, is a count of edges in a shortest path connecting the two nodes in the social graph 900. As an example and not by way of limitation, in the social graph 900, the user node 902 of user "C" is connected to the user node 902 of user "A" via multiple paths including, for example, a first path directly passing through the user node 902 of user "B," a second path passing through the concept node 904 of company "Acme" and the user node 902 of user "D," and a third path passing through the user nodes 902 and concept nodes 904 representing school "Stanford," user "G," company "Acme," and user "D." User "C" and user "A" have a degree of separation of two because the shortest path connecting their corresponding nodes (i.e., the first path) includes two edges 906.

In particular embodiments, an edge 906 between a user node 902 and a concept node 904 may represent a particular action or activity performed by a user associated with user node 902 toward a concept associated with a concept node 904. As an example and not by way of limitation, as illustrated in FIG. 9, a user may "like," "attended," "played," "listened," "cooked," "worked at," or "watched" a concept, each of which may correspond to an edge type or subtype. A concept-profile page corresponding to a concept node 904 may include, for example, a selectable "check in" icon (such as, for example, a clickable "check in" icon) or a selectable "add to favorites" icon. Similarly, after a user clicks these icons, social-networking system 860 may create a "favorite" edge or a "check in" edge in response to a user's action corresponding to a respective action. As another example and not by way of limitation, a user (user "C") may listen to a particular song ("Imagine") using a particular application (an online music application). In this case, social-networking system 860 may create a "listened" edge 906 and a "used" edge (as illustrated in FIG. 9) between user nodes 902 corresponding to the user and concept nodes 904 corresponding to the song and application to indicate that the user listened to the song and used the application. Moreover, social-networking system 860 may create a "played" edge 906 (as illustrated in FIG. 9) between concept nodes 904 corresponding to the song and the application to indicate that the particular song was played by the particular application. In this case, "played" edge 906 corresponds to an action performed by an external application on an external audio file (the song "Imagine"). Although this disclosure describes particular edges 906 with particular attributes connecting user nodes 902 and concept nodes 904, this disclosure contemplates any suitable edges 906 with any suitable attributes connecting user nodes 902 and concept nodes 904. Moreover, although this disclosure describes edges between a user node 902 and a concept node 904 representing a single relationship, this disclosure contemplates edges between a user node 902 and a concept node 904 representing one or more relationships. As an example and not by way of limitation, an edge 906 may represent both that a user likes and has used at a particular concept. Alternatively, another edge 906 may represent each type of relationship (or multiples of a single relationship) between a user node 902 and a concept node 904 (as illustrated in FIG. 9 between user node 902 for user "E" and concept node 904).

In particular embodiments, social-networking system 860 may create an edge 906 between a user node 902 and a concept node 904 in social graph 900. As an example and not by way of limitation, a user viewing a concept-profile page (such as, for example, by using a web browser or a special-purpose application hosted by the user's client system 830) may indicate that he or she likes the concept represented by the concept node 904 by clicking or selecting a "Like" icon, which may cause the user's client system 830 to send to social-networking system 860 a message indicating the user's liking of the concept associated with the concept-profile page. In response to the message, social-networking system 860 may create an edge 906 between user node 902 associated with the user and concept node 904, as illustrated by "like" edge 906 between the user and concept node 904. In particular embodiments, social-networking system 860 may store an edge 906 in one or more data stores. In particular embodiments, an edge 906 may be automatically formed by social-networking system 860 in response to a particular user action. As an example and not by way of limitation, if a first user uploads a picture, watches a movie, or listens to a song, an edge 906 may be formed between user node 902 corresponding to the first user and concept nodes 904 corresponding to those concepts. Although this disclosure describes forming particular edges 906 in particular manners, this disclosure contemplates forming any suitable edges 906 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 860). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 860. In addition or as an alternative, the social action may be promoted outside or off of social-networking system 860, where appropriate. In particular embodiments, a page may be an on-line presence (such as a webpage or website within or outside of social-networking system 860) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 860. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. 2012/0203831, entitled "Sponsored Stories Unit Creation from Organic Activity Stream" and filed 3 Feb. 2012 as U.S. patent application Ser. No. 13/020,745, or U.S. Patent Application Publication No. 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 860) or RSVP (e.g., through social-networking system 860) to an event associated with the advertisement. In addition or as an alternative, an advertisement may include social-networking-system content directed to the user. For example, an advertisement may display information about a friend of the user within social-networking system 860 who has taken an action associated with the subject matter of the advertisement.

Social-networking-system functionality or content may be associated with an advertisement in any suitable manner. For example, an advertising system (which may include hardware, software, or both for receiving bids for advertisements and selecting advertisements in response) may retrieve social-networking functionality or content from social-networking system 860 and incorporate the retrieved social-networking functionality or content into the advertisement before serving the advertisement to a user. Examples of selecting and providing social-networking-system functionality or content with an advertisement are disclosed in U.S. Patent Application Publication No. 2012/0084160, entitled "Providing Social Endorsements with Online Advertising" and filed 5 Oct. 2010 as U.S. patent application Ser. No. 12/898,662, and in U.S. Patent Application Publication No. 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or content may cause information about the interaction to be displayed in a profile page of the user in social-networking-system 860.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 860 to identify those users. In addition or as an alternative, social-networking system 860 may use user-profile information in social-networking system 860 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 860, off or outside of social-networking system 860, or on mobile computing devices of users. When on or within social-networking system 860, such targeting may be directed to users' news feeds, search results, e-mail or other in-boxes, or notifications channels or may appear in particular area of web pages of social-networking system 860, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 860, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 860 or explicit connections of a user to a node, object, entity, brand, or page on social-networking system 860. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals; light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. 2012/0159635, entitled "Comment Plug-In for Third-Party System" and filed 15 Dec. 2010 as U.S. patent application Ser. No. 12/969,368; U.S. Patent Application Publication No. 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Pat. No. 8,402,094, entitled "Providing a Newsfeed Based on User Affinity for Entities and Monitored Actions in a Social Network Environment" and filed 11 Aug. 2006 as U.S. patent application Ser. No. 11/503,093; U.S. Patent Application Publication No. 2012/0072428, entitled "Action Clustering for News Feeds" and filed 16 Sep. 2010 as U.S. patent application Ser. No. 12/884,010; U.S. Patent Application Publication No. 2011/0004692, entitled "Gathering Information about Connections in a Social Networking Service" and filed 1 Jul. 2009 as U.S. patent application Ser. No. 12/496,606; U.S. Patent Application Publication No. 2008/0065701, entitled "Method and System for Tracking Changes to User Content in an Online Social Network" and filed 12 Sep. 2006 as U.S. patent application Ser. No. 11/531,154; U.S. Patent Application Publication No. 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In particular embodiments, social-networking system 860 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 870 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 860 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 860 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 860 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 860 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 860 may calculate a coefficient based on a user's actions. Social-networking system 860 may monitor such actions on the online social network, on a third-party system 870, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 860 may calculate a coefficient based on the user's actions with particular types of content. The content may be associated with the online social network, a third-party system 870, or another suitable system. The content may include users, profile pages, posts, news stories, headlines, instant messages, chat room conversations, emails, advertisements, pictures, video, music, other suitable objects, or any combination thereof. Social-networking system 860 may analyze a user's actions to determine whether one or more of the actions indicate an affinity for subject matter, content, other users, and so forth. As an example and not by way of limitation, if a user frequently posts content related to "coffee" or variants thereof, social-networking system 860 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 860 may calculate a coefficient based on the type of relationship between particular objects. Referencing the social graph 900, social-networking system 860 may analyze the number and/or type of edges 906 connecting particular user nodes 902 and concept nodes 904 when calculating a coefficient. As an example and not by way of limitation, user nodes 902 that are connected by a spouse-type edge (representing that the two users are married) may be assigned a higher coefficient than user nodes 902 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 860 may determine that the user has a higher coefficient with respect to the first photo than the second photo because having a tagged-in-type relationship with content may be assigned a higher weight and/or rating than having a like-type relationship with content. In particular embodiments, social-networking system 860 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 860 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 900. As an example and not by way of limitation, social-graph entities that are closer in the social graph 900 (i.e., fewer degrees of separation) may have a higher coefficient than entities that are further apart in the social graph 900.

In particular embodiments, social-networking system 860 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 830 of the user). A first user may be more interested in other users or concepts that are closer to the first user. As an example and not by way of limitation, if a user is one mile from an airport and two miles from a gas station, social-networking system 860 may determine that the user has a higher coefficient for the airport than the gas station based on the proximity of the airport to the user.

In particular embodiments, social-networking system 860 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 860 may provide information that is relevant to user's interests and current circumstances, increasing the likelihood that they will find such information of interest. In particular embodiments, social-networking system 860 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 860 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 860 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 870 (e.g., via an API or other communication channel), or from another suitable system. In response to the request, social-networking system 860 may calculate the coefficient (or access the coefficient information if it has previously been calculated and stored). In particular embodiments, social-networking system 860 may measure an affinity with respect to a particular process. Different processes (both internal and external to the online social network) may request a coefficient for a particular object or set of objects. Social-networking system 860 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more objects (e.g., content or other types of objects) of a computing system may be associated with one or more privacy settings. The one or more objects may be stored on or otherwise associated with any suitable computing system or application, such as, for example, a social-networking system 860, a client system 830, a third-party system 870, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 904 corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 860 or shared with other systems (e.g., a third-party system 870). Although this disclosure describes using particular privacy settings in a particular manner, this disclosure contemplates using any suitable privacy settings in any suitable manner.

In particular embodiments, privacy settings may be based on one or more nodes or edges of a social graph 900. A privacy setting may be specified for one or more edges 906 or edge-types of the social graph 900, or with respect to one or more nodes 902, 904 or node-types of the social graph 900. The privacy settings applied to a particular edge 906 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 860. The object may be associated with a concept node 904 connected to a user node 902 of the first user by an edge 906. The first user may specify privacy settings that apply to a particular edge 906 connecting to the concept node 904 of the object, or may specify privacy settings that apply to all edges 906 connecting to the concept node 904. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 860 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 860 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 870, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 862 may be authorization/privacy servers for enforcing privacy settings. In response to a request from a user (or other entity) for a particular object stored in a data store 864, the social-networking system 860 may send a request to the data store 864 for the object. The request may identify the user associated with the request and the object may be sent only to the user (or a client system 830 of the user) if the authorization server determines that the user is authorized to access the object based on the privacy settings associated with the object. If the requesting user is not authorized to access the object, the authorization server may prevent the requested object from being retrieved from the data store 864 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 860, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 860 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 860 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 860 may access such information in order to provide a particular function or service to the first user, without the social-networking system 860 having access to that information for any other purposes. Before accessing, storing, or using such objects or information, the social-networking system 860 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 860.

In particular embodiments, a user may specify whether particular types of objects or information associated with the first user may be accessed, stored, or used by the social-networking system 860. As an example and not by way of limitation, the first user may specify that images sent by the first user through the social-networking system 860 may not be stored by the social-networking system 860. As another example and not by way of limitation, a first user may specify that messages sent from the first user to a particular second user may not be stored by the social-networking system 860. As yet another example and not by way of limitation, a first user may specify that all objects sent via a particular application may be saved by the social-networking system 860.

In particular embodiments, privacy settings may allow a first user to specify whether particular objects or information associated with the first user may be accessed from particular client systems 830 or third-party systems 870. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 860 may provide default privacy settings with respect to each device, system, or application, and/or the first user may be prompted to specify a particular privacy setting for each context. As an example and not by way of limitation, the first user may utilize a location-services feature of the social-networking system 860 to provide recommendations for restaurants or other places in proximity to the user. The first user's default privacy settings may specify that the social-networking system 860 may use location information provided from a client device 830 of the first user to provide the location-based services, but that the social-networking system 860 may not store the location information of the first user or provide it to any third-party system 870. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, the social-networking system 860 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 860. The user's privacy settings may specify that such information may be used only for particular processes, such as authentication, and further specify that such information may not be shared with any third-party system 870 or used for other processes or applications associated with the social-networking system 860. As another example and not by way of limitation, the social-networking system 860 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 870 or used by other processes or applications associated with the social-networking system 860. As another example and not by way of limitation, the social-networking system 860 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any third-party system 870 or used by other processes or applications associated with the social-networking system 860.

In particular embodiments, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The social-networking system 860 may determine that this privacy setting also applies to the first image and make the first image visible only to the first user group. In particular embodiments, the change in privacy settings may take effect only going forward. Continuing the example above, if the first user changes privacy settings and then shares a second image, the second image may be visible only to the first user group, but the first image may remain visible to all users. In particular embodiments, in response to a user action to change a privacy setting, the social-networking system 860 may further prompt the user to indicate whether the user wants to apply the changes to the privacy setting retroactively. In particular embodiments, a user change to privacy settings may be a one-off change specific to one object. In particular embodiments, a user change to privacy may be a global change for all objects associated with the user.

In particular embodiments, the social-networking system 860 may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular embodiments, upon determining that a trigger action has occurred, the social-networking system 860 may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular embodiments, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social-networking system 860 may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the social-networking system 860 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular embodiments, a user may need to provide verification of a privacy setting on a periodic basis. A prompt or reminder may be periodically sent to the user based either on time elapsed or a number of user actions. As an example and not by way of limitation, the social-networking system 860 may send a reminder to the user to confirm his or her privacy settings every six months or after every ten photo posts. In particular embodiments, privacy settings may also allow users to control access to the objects or information on a per-request basis. As an example and not by way of limitation, the social-networking system 860 may notify the user whenever a third-party system 870 attempts to access information associated with the user, and require the user to provide verification that access should be allowed before proceeding.

Figure 10:
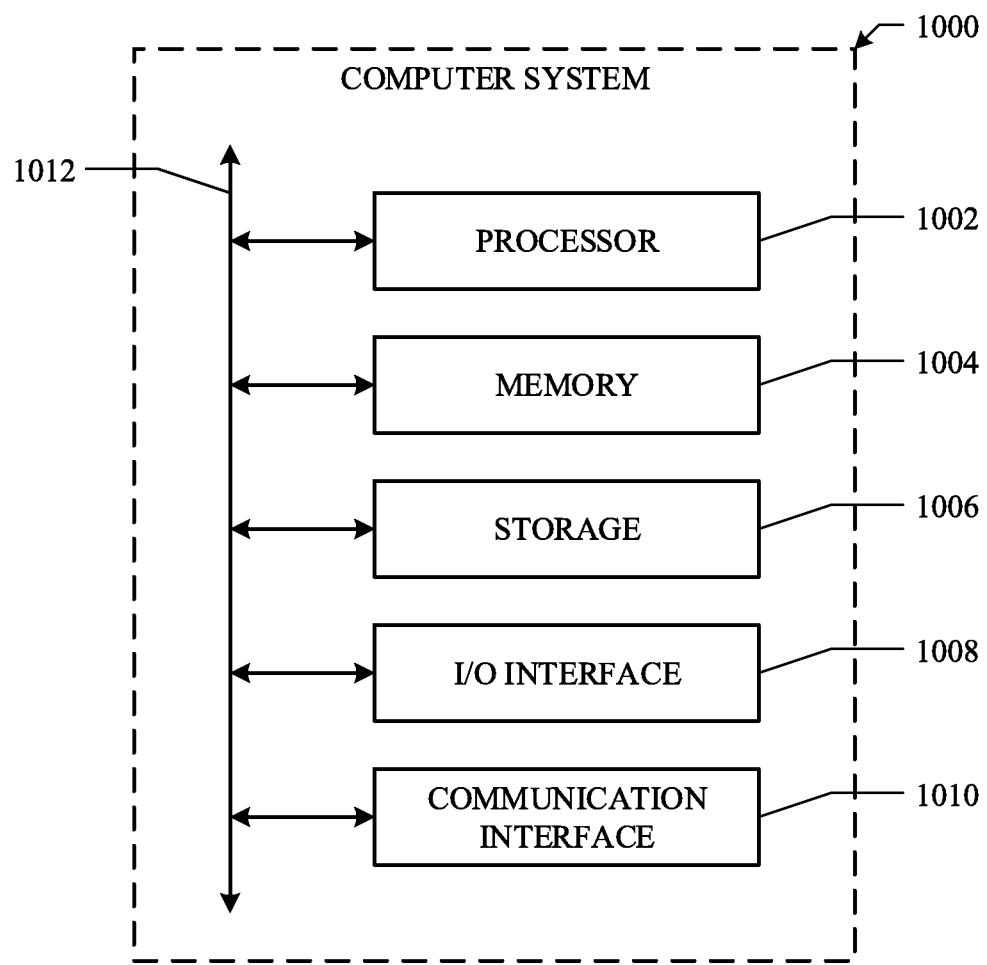
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by a computing device associated with a social-networking system, receiving a plurality of data items respectively associated with a plurality of conversion events, wherein the plurality of conversion events are respectively associated with a plurality of transactions at one or more point-of-sale devices associated with a business;
   by the computing device and based on the data items, identifying, from one or more data stores associated with the social-networking system, a content object corresponding to the business, the content object comprising information describing the business;
   by the computing device and based on the data items associated with the plurality of conversion events, identifying one or more users of a plurality of users associated with at least one conversion event of the plurality of conversion events by:
      accessing spatio-temporal information associated with each user of the plurality of users; and
      filtering out one or more users of the plurality of users by comparing the spatio-temporal information associated with each user of the plurality of users with information associated with the conversion events;
   by the computing device, generating a proposed update to the content object based at least in part on an aggregate determined location, wherein the aggregate determined location is computed by aggregating a determined location of each user of the one or more users identified at the time of a conversion event associated with the user;
   by the computing device, providing a notification to the business requesting confirmation for the proposed update;
   by the computing device, receiving confirmation for the proposed update from the business;
   by the computing device, updating the content object on the one or more data stores corresponding to the business based at least in part on the aggregate determined location; and
   by the computing device, providing the updated content object corresponding to the business to the one or more users of the social-networking system.

2. The method of claim 1, wherein one or more of the data items are received from:
   a computing device associated with a business entity associated with the identified business;
   a computing device associated with a payment network associated with one or more of the conversion events; or
   a client device associated with a user of the social-networking system.

3. The method of claim 1, wherein a data item associated with a conversion event comprises:
   an identifier of a business entity;
   an identifier of a business location;
   an identifier of a customer;
   a description of a customer;
   a timestamp;
   information about an amount of payment; or
   information about a product or service.

4. The method of claim 1, wherein the identifying the one or more users further comprises:
   identifying a first user based on the data item associated with a first conversion event;
   identifying one or more second users each being connected to the first user on a social graph associated with the social-networking system; and selecting one of the second users as being associated with the first conversion event, wherein the second user is selected based on:
  information about a relationship between the second user and the first user on the social-networking system, or
  spatio-temporal information associated with the second user.

5. The method of claim 1, wherein the determined location associated with at least one user of the one or more users is determined based on data received from a client device associated with the at least one user.

6. The method of claim 1, wherein the updating the content object comprises:
  updating an address of the business corresponding to the content object; or
  updating business hours of the business corresponding to the content object.

7. The method of claim 1, wherein:
  the business is associated with a plurality of locations, each location associated with a franchise of the business; and
  the content object corresponding to the business further corresponds to a first franchise of the business.

8. The method of claim 1, wherein:
  the business is associated with a plurality of locations, each location associated with a franchise of the business; and
  the content object corresponding to the business comprises information describing the plurality of franchises of the business.

9. The method of claim 1, wherein the content object associated with the business is a profile page corresponding to the business on the social-networking system.

10. The method of claim 1, wherein the information describing the business in the content object comprises a location associated with the business, and wherein generating the proposed update to the content object comprises:
  comparing the location associated with the business to the aggregate determined location.

11. The method of claim 1, wherein aggregating the determined location of each of the one or more of the users identified at the time of the conversion event associated with the user comprises:
  aggregating a cluster of coordinates corresponding to the determined location of each user of the one or more users;
  computing a weighted average of the determined locations of each user of the one or more users; or
  selecting a location representative of a majority of the determined locations of each user of the one or more users.

12. One or more computer-readable non-transitory storage media embodying software that is operable when executed by one or more processors to performed operations comprising:
  receiving a plurality of data items respectively associated with a plurality of conversion events, wherein the plurality of conversion events are respectively associated with a plurality of transactions at one or more point-of-sale devices associated with a business;
  identifying, based on the data items and from one or more data stores associated with a social-networking system, a content object corresponding to the business, the content object comprising information describing the business;
  based on the data items associated with the plurality of conversion events, identifying one or more users of a plurality of users associated with at least one conversion event of the plurality of conversion events by:
    accessing spatio-temporal information associated with each user of the plurality of users; and
      filtering out one or more users of the plurality of users by comparing the spatio-temporal information associated with each user of the plurality of users with information associated with the conversion events;
  generating a proposed update to the content object based at least in part on an aggregate determined location, wherein the aggregate determined location is computed by aggregating a determined location of each user of the one or more users identified at the time of a conversion event associated with the user;
  providing a notification to the business requesting confirmation for the proposed update;
  receiving confirmation for the proposed update from the business;
  updating the content object on the one or more data stores corresponding to the business based at least in part on the aggregate determined location; and
  providing the updated content object corresponding to the business to the one or more users of the social-networking system.

13. The one or more computer-readable non-transitory storage media of claim 12, wherein one or more of the data items are received from:
  a computing device associated with a business entity associated with the identified business;
  a computing device associated with a payment network associated with one or more of the conversion events; or
  a client device associated with a user of the social-networking system.

14. The one or more computer-readable non-transitory storage media of claim 12, wherein a data item associated with a conversion event comprises:
  an identifier of a business entity;
  an identifier of a business location;
  an identifier of a customer;
  a description of a customer;
  a timestamp;
  information about an amount of payment; or
  information about a product or service.

15. The one or more computer-readable non-transitory storage media of claim 12, wherein aggregating the determined location of each of the one or more of the users identified at the time of the conversion event associated with the user comprises:
  aggregating a cluster of coordinates corresponding to the determined location of each user of the one or more users;
  computing a weighted average of the determined locations of each user of the one or more users; or
  selecting a location representative of a majority of the determined locations of each user of the one or more users.

16. A system comprising:
one or more processors; and
one or more computer-readable non-transitory storage media coupled to one or more of the processors and comprising instructions operable when executed by one or more of the processors to cause the system to perform operations comprising:

receiving a plurality of data items respectively associated with a plurality of conversion events, wherein the plurality of conversion events are respectively associated with a plurality of transactions at one or more point-of-sale devices associated with a business;

identifying, based on the data items and from one or more data stores associated with a social-networking system, a content object corresponding to the business, the content object comprising information describing the business;

based on the data items associated with the plurality of conversion events, identifying one or more users of a plurality of users associated with at least one conversion event of the plurality of conversion events by:
  accessing spatio-temporal information associated with each user of the plurality of users; and
  filtering out one or more users of the plurality of users by comparing the spatio-temporal information associated with each user of the plurality of users with information associated with the conversion events;

generating a proposed update to the content object based at least in part on an aggregate determined location, wherein the aggregate determined location is computed by aggregating a determined location of each user of the one or more users identified at the time of a conversion event associated with the user;

providing a notification to the business requesting confirmation for the proposed update;

receiving confirmation for the proposed update from the business;

updating the content object on the one or more data stores corresponding to the business based at least in part on the aggregate determined location; and providing the updated content object corresponding to the business to the one or more users of the social-networking system.

17. The system of claim 16, wherein one or more of the data items are received from:
  a computing device associated with a business entity associated with the identified business;
  a computing device associated with a payment network associated with one or more of the conversion events; or
  a client device associated with a user of the social-networking system.

18. The system of claim 16, wherein a data item associated with a conversion event comprises:
  an identifier of a business entity;
  an identifier of a business location;
  an identifier of a customer;
  a description of a customer;
  a timestamp;
  information about an amount of payment; or
  information about a product or service.

19. The system of claim 16, wherein aggregating the determined location of each of the one or more of the users identified at the time of the conversion event associated with the user comprises:
  aggregating a cluster of coordinates corresponding to the determined location of each user of the one or more users;
  computing a weighted average of the determined locations of each user of the one or more users; or
  selecting a location representative of a majority of the determined locations of each user of the one or more users.

* * * * *